United States Patent
Petersmann et al.

[11] Patent Number: 6,086,506
[45] Date of Patent: Jul. 11, 2000

[54] METHOD OF CONTROLLING A CONTINUOUSLY VARIABLE TRANSMISSION AUTOMATICALLY OR AS A DRIVER-CONTROLLED MANUAL STEPPED TRANSMISSION

[75] Inventors: Joseph Petersmann, Wimsheim; Willi Seidel, Eberdingen-Hochdorf; Heinz Stehle, Weissach; Werner Möllers, Wiernsheim; Uwe Fröschke, Wimsheim, all of Germany

[73] Assignee: Dr. Ing. h.c.F. Porsche AG, Germany

[21] Appl. No.: 08/832,183

[22] Filed: Apr. 8, 1997

Related U.S. Application Data

[63] Continuation of application No. 08/690,459, Jul. 29, 1996, abandoned, which is a continuation of application No. 08/170,184, Dec. 21, 1993, abandoned.

[30] Foreign Application Priority Data

Jun. 21, 1991 [DE] Germany ............................... 41 20 540
May 22, 1992 [WO] WIPO ...................... PCT/EP92/01155

[51] Int. Cl.$^7$ ............................. F16H 61/00; F16H 61/02
[52] U.S. Cl. .................................. 477/45; 477/46; 477/48; 74/335
[58] Field of Search ......................... 477/45–49; 74/335

[56] References Cited

U.S. PATENT DOCUMENTS

| | | | |
|---|---|---|---|
| 5,624,348 | 4/1997 | Lardy et al. ............................... | 477/46 |
| 5,628,705 | 5/1997 | Kashiwabara .............................. | 477/46 |
| 5,688,204 | 11/1997 | Runge et al. ............................. | 477/46 |

FOREIGN PATENT DOCUMENTS

| | | | |
|---|---|---|---|
| 60-44651 | 3/1985 | Japan ....................................... | 477/46 |

Primary Examiner—Khoi Q. Ta
Attorney, Agent, or Firm—Evenson, McKeown, Edwards & Lenahan, P.L.L

[57] ABSTRACT

The invention relates to a method for controlling a continuously variable transmission with an electrohydraulic control, a selector device, and a controllable engaging clutch of a motor vehicle, especially one powered by an internal combustion engine, with a control device in a first operating mode automatically selecting and adjusting a gear ratio for the transmission from signals of the selector device and the operating parameters of the motor vehicle such as the throttle angle, driving speed and engine rpm, by means of curves selectable by the driver.

It is proposed, in a second operating mode, to simulate a multi-step transmission influenceable directly by the driver. In order to permit use of this operating mode, only a few preset gear ratios are made available to the driver. In addition, from the operating parameters of the vehicle, but at least from a throttle signal value, as described in DE-OS 39 22 051, a parameter called driving activity SK(t) is obtained which evaluates the driving style of the driver or his behavior as a function of traffic situations relative to the control of the motor vehicle.

The preset gear ratios are combined in groups. Depending on the driving activity SK(t) which has been determined, a group is selected. With higher driving activity SK(t), groups are selected in which the gear ratios are spread more widely and the number of gear ratios is greater. For less driving activity, SK(t) groups are selected whose spread is less and in which the number of gear ratios is smaller.

21 Claims, 10 Drawing Sheets

METHOD OF CONTROLLING A CONTINUOUSLY VARIABLE TRANSMISSION AUTOMATICALLY OR AS A DRIVER-CONTROLLED MANUAL STEPPED TRANSMISSION

CROSS-REFERENCE TO RELATED APPLICATION

This application is related to application Ser. No. 08/167,905 filed on May 9, 1994 in the name of Willi SEIDEL et al. for METHOD FOR CONTROLLING AN AUTOMATICALLY OPERATED MOTOR VEHICLE TRANSMISSION.

This application is a continuation of application Ser. No. 08/690,459 filed Jul. 29, 1996, now abandoned which is a continuation of application Ser. No. 08/170,184 filed Dec. 21, 1993, now abandoned.

The invention relates to a method for controlling an electrohydraulically actuated continuously variable transmission according to the preamble of Claim 1, as known from U.S. Pat. No. 4,836,056 A.

Improvements in the field of the drive train of motor vehicles are concerned primarily with ways of improving economy. Various approaches have been taken depending on the type of transmission.

In shifted transmissions, the number of gears is increased by adding an additional gear pair in order to operate the internal combustion engine, preferably used as the drive, hereinafter also referred to as the motor, as close to its optimum operating point as possible. However this measure increases the weight of the transmission and its moment of inertia. In addition, operation of the transmission imposes limits on this type of expansion. The conventional H-pattern with more than six gears is not obvious and, especially in non-steady-state operation of the motor vehicle, the driver must devote increasing amounts of time and attention to operating the transmission.

Opportunities for facilitating the operation of a transmission with more then six gears are known for example from the commercial vehicle area. For example in the DE-Book VDI Reports 612 "Electronics in Motor Vehicle Design," pages 191 to 202, VDI-Verlag Dusseldorf 1986, an electropneumatic gearshift is disclosed in which the gears are preselected by a toggle switch shifting one gear up or one gear down) and the shift is then engaged under the control of an auxiliary force after being checked by a control logic. Transfer to automobiles has not yet been accomplished.

Automatic transmissions completely relieve the driver of the functions "select and engage the gears." Despite lower mechanical efficiency in comparison to conventional transmissions, they can achieve a higher overall efficiency if the motor is operated in the vicinity of its most efficient operating point. In motor vehicles, they are provided as a rule by planetary transmissions with hydrodynamic converters located upstream. The ranking of the gear ratios established by the geometric relationships in the planetary transmissions allow expansion of such a transmission but this is not freely selectable and also increases the dimensions and the weight of the transmission, as in the case of a manual transmission.

In addition, continuously variable transmissions are currently installed in motor vehicles especially in the design known as a friction transmission. In contrast to the transmissions described above, the spread is greater and the number of possible gear ratios is unlimited. The considerable spread permits both performance-optimized as well as consumption-optimized operation of the motor vehicle.

In addition, particularly when changing from a multi-step transmission to a continuously variable transmission, it has been perceived as disturbing that in a motor vehicle with such a transmission the driving speed and engine noise are decoupled. This makes it more difficult to estimate the actual speed and the actual acceleration.

Finally, the shifting speed of continuously variable transmissions is limited and depends upon the transmission input rpm. In a first approximation, shifting the transmission from the lowest to the highest gear ratio requires a certain number of revolutions of the V-belt pulley on the input side. The delay associated with this, between the demand for power, and the delivery of that power, is very disturbing for example in a passing maneuver or in sports driving.

The U.S. Pat. No. 4,836,056 A shows a CVT-transmission, in which, in addition to a continuous operating mode, a multi-step operating mode is provided which both operate automatically as a function of operating parameters of the vehicle. From JP 60-26847 A, a CVT transmission is known whose ratio may be preset by the driver in an arbitrary and continuous manner.

Finally, the shifting speed of continuously variable transmissions is limited and depends upon the transmission input rpm. In a first approximation, shifting the transmission from the lowest to the highest gear ratio requires a certain number of revolutions of the V-belt pulley on the input side. The delay associated with this, between the demand for power, and the delivery of that power, is very disturbing for example in a passing maneuver or in sports driving.

The goal of the invention is to provide a method of controlling an electrohydraulically actuated continuously variable transmission that permits direct intervention by the driver in the selection of the gear ratio, with a simultaneously improved operating ability.

The solution to this problem is presented in Claim 1. Advantageous measures that are improvements on the invention are described in the subclaims.

The advantages of the invention lie in the fact that a method is provided for controlling an electrohydraulically actuated continuously variable transmission, which permits direct intervention of the driver in the choice of the gear ratio by simulating a multi-step transmission, which is modeled on a multi-step transmission in its simple and obvious operation.

A motor vehicle equipped with a transmission operated according to the method of the invention can be operated in fatiguing standard driving situations such as driving in city traffic or in a traffic jam in a first operating mode which automatically selects the gear ratio, with the driver being freed of the responsibility for selecting and engaging the correct gear ratio. In unclear situations or when engaging in sports driving, it is possible to influence the choice of the gear ratio directly in a second operating mode in the same way as in a manual transmission and to select for the individual situation, the most favorable gear ratio from a group of preset gear ratios.

In addition, this method makes the acceptance of a continuously variable transmission greater for drivers who are accustomed to manual transmissions. The separation of engine noise from driving speed, which is unfamiliar to untrained drivers, is not present in the second operating mode. Thus, a safety advantage is also linked to the driving feel which has thus been restored.

The gear ratio that has been set is varied by small amounts during operation; as a result the wear that results from running in of the elements of a continuously variable transmission that are subject to loads is counteracted when this transmission is operated with a fixed gear ratio. With the large possible spread of a continuously variable transmission, more extreme designs are possible than would be feasible with multi-step transmissions. In an extreme case, overdrive gear ratios can be provided in a transmission that permit only maintenance of a certain speed that has been reached without further accelerations, as well as extreme gear ratios designed for acceleration, e.g. for uphill travel, in which the maximum speed of the motor vehicle is determined not by the air resistance but by the climbing ability at maximum rpm of the driving internal combustion engine.

An advantageous improvement on the invention provides for storing several groups of preset gear ratios in a memory. The individual groups are assigned to a value of the driving activity (SK(t) that evaluates the driving style of the driver or his behavior as a function of a traffic situation relative to the control of the motor vehicle, and can also be selected by means of this driving activity (SK(t). This permits adjustment of the spread and number of the preset gear ratios to the driver's driving style, as is possible in a multi-step transmission only by mechanical changes. In a transmission, depending on the driving style of the driver, during operation alternately an overdrive transmission, a normally designed transmission, or a sports transmission with all possible intermediate stages are provided, with the above-mentioned extreme settings not being reached as a rule.

In addition, it is provided that the values stored in the memory are variable. This provides the possibility of "end-of-line programming," in other words vehicle-specific programming of the preset gear ratios at the end of the production process. In addition, other changes and hence adjustments to customer wishes by customer service are possible, for example the nature of the above-mentioned extreme settings, are possible in this type of presetting.

In addition transmissions with more than six gears may be operated by the proposed selector device. With a multipartite design of the selector device, the gear ratios can be changed by the driver without having to let go of the steering wheel.

A continuously variable transmission operated according to the proposed method is especially suitable, because of the fixed gear ratios, for the use of mechanical or hydraulic bracing devices that determine the gear ratio. By such a measure, the power draw of a hydraulic pump, an important energy consumer in a continuously variable transmission and hence one of the reasons for poorer mechanical efficiency in comparison to a manual transmission, is considerably reduced and hence the mechanical efficiency is increased.

To increase the total efficiency, it is also possible to use a variable-displacement pump. This pump allows the pumping power and hence the energy consumption of the pump to be adjusted to the pumping power actually required, instead of a pump that is designed for the maximum required power being operated only briefly under full load and otherwise under partial load.

The invention will now be described with reference to the embodiments shown in the drawings.

Figure 1:
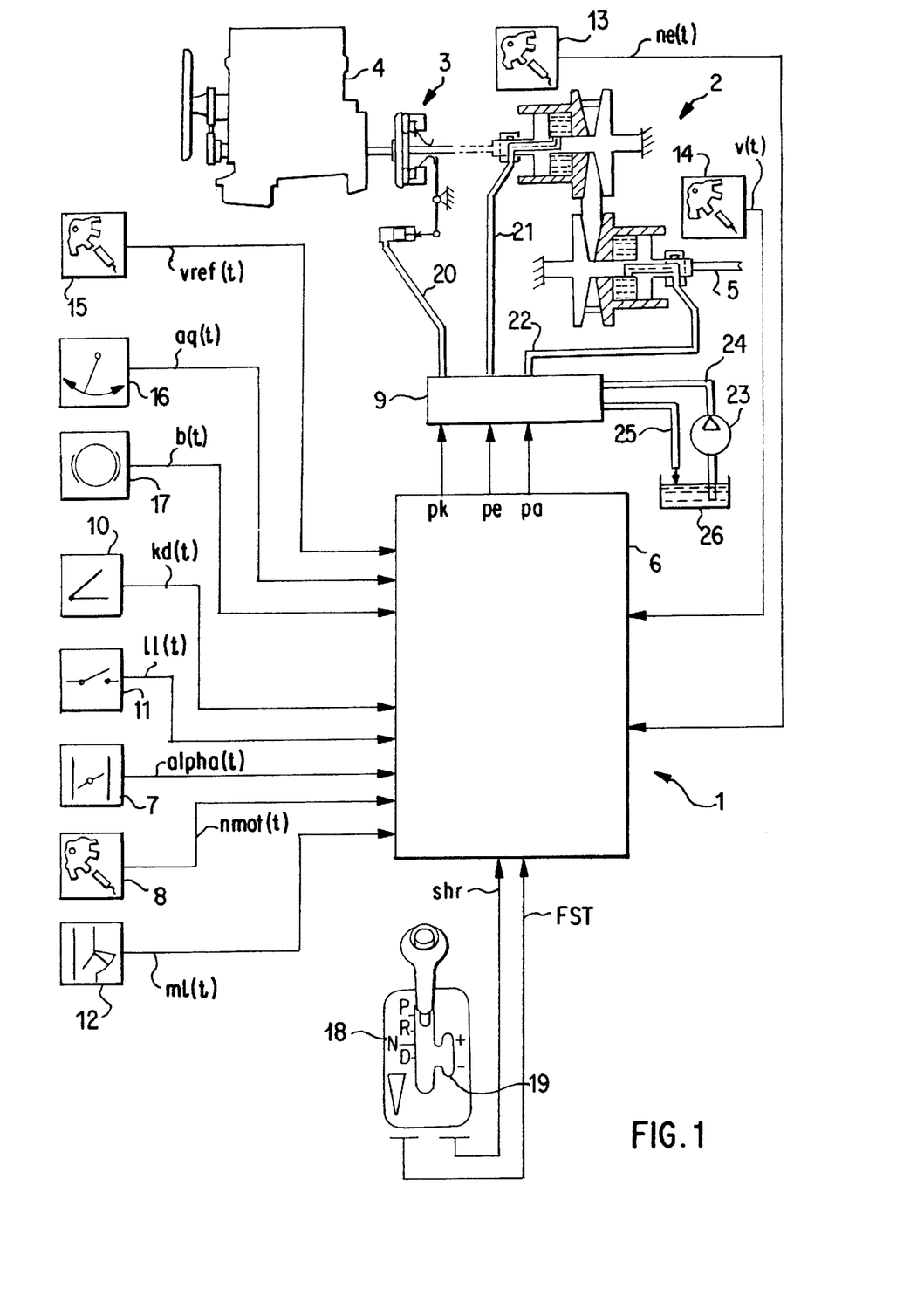
FIG. 1 is a block diagram of an electrical control for a continuously variable transmission of a motor vehicle.

FIG. 1 shows a block diagram of a control 1 of an electrohydraulically operated continuously variable transmission 2 using the example of a friction transmission. Continuously variable transmission 2 is driven through a controllable engaging clutch 3 by an internal combustion engine 4. A driveshaft 5 of continuously variable transmission 2 is connected with a wheel drive (not shown) of a motor vehicle.

Values or functions that change with time t are represented in the following as functions f(t) of time t.

A control device 6 controls, at least as a function of the throttle position alpha(t) of a throttle angle sensor 7 and an engine rpm nmot(t) of an engine rpm sensor 8 of internal combustion engine 4, a hydraulic valve body 9. To control the continuously variable transmission 2 and the engaging clutch 3, control device 6 receives as additional input parameters, a kick-down signal kd(t) from a kick-down switch 10, a neutral signal 11(t) from a neutral switch 11, an air volume or air mass ml(t) from an air volume or air mass sensor 12 of internal combustion engine 4, as well as a transmission input rpm ne(t) from a transmission input rpm sensor 13 and a driving speed v(t) from a driving speed sensor 14. In addition, from control device 6, a speed vref(t) of a reference speed sensor 15 on a non-powered vehicle axle, a transverse acceleration aq(t) from a transverse acceleration sensor 16, and a braking signal b(t) from a braking signal sensor 17 are detected and processed.

Finally the control is influenceable in usual fashion by the vehicle driver by a selector device 18 to preselect driving gears P (park), R (reverse), N (neutral), and D (automatic adjustment of the gear ratio, etc. of the continuously variable transmission); in addition, an adjustment range for selector device 18 for direct input of the gear ratio, etc. is provided.

Selector device 18 can be moved from gear D into a second notch 19, in which selector device 18 operates as a toggle switch and the vehicle driver can influence the gear ratio to upshift or downshift. Selector device 18 delivers a gear signal FST and a shift request signal SHR for upshifting or downshifting.

Here and in the following the term "upshifting" or "reducing the gear ratio" refers to a change in the gear ratio that increases the output rpm of the transmission while keeping the input rpm constant. Conversely, the terms "downshift" and "increase the gear ratio" stand for a change in the gear ratio that results in a reduction of the output rpm of the transmission while keeping the input rpm constant.

Depending on the above values, control device 6, by means of a signal output pk and valve body 9, controls the hydraulic pressure in engaging clutch 3 as well as, through signal outputs pe and pa and hydraulic valve body 9, the gear ratio ue between the transmission input rpm ne(t) and the transmission output rpm (driving speed) v(t). Hydraulic valve body 9 connects corresponding control lines 20, 21, and 22 of engaging clutch 3 and of continuously variable transmission 2 with a pressure line 24 connected to a pump 23 or with a return line 25 to a supply tank 26 for hydraulic fluid.

Figure 2:
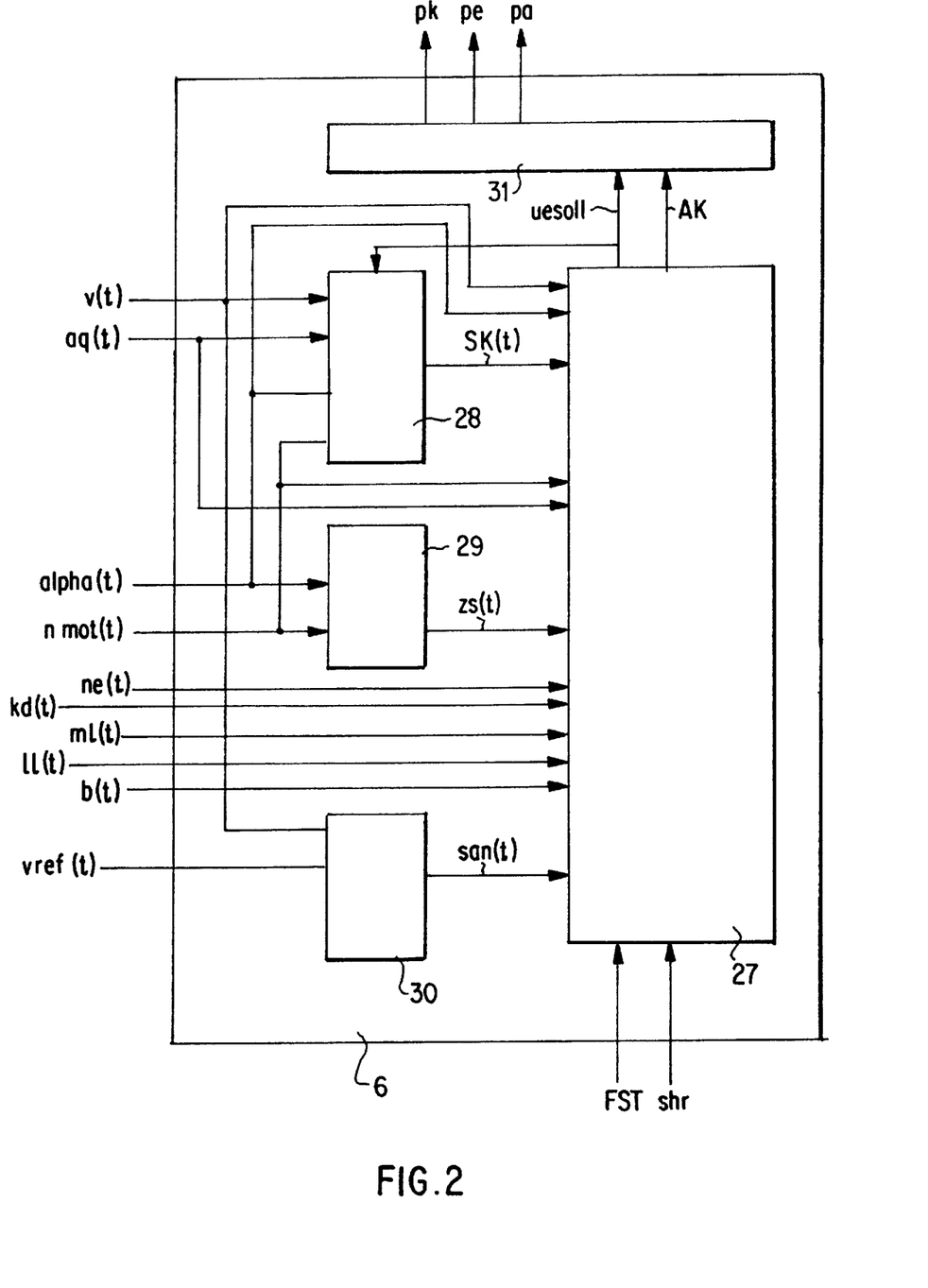
FIG. 2 is a block diagram of the control functions performed by means of a control device according to FIG. 1.

As shown in FIG. 2, control device 6 comprises a gear ratio control 27 connected with a driving activity determination function 28, an accelerate-coast determination function 29, a drive slip determination function 30, and a position function 31.

The driving activity determining function 28 determines a parameter that evaluates the driving style of the driver or his behavior as a function of a traffic situation relative to the control of the motor vehicle called driving activity SK(t), preferably according to a method described in U.S. Pat. No. 5,157,609, the subject matter of which is incorporated by reference herein.

The accelerate-coast determination function 29, depending on the throttle position alpha(t) and the engine rpm nmot(t), delivers a signal for acceleration or coasting of the vehicle, accelerate/coast zs(t), and the drive slip determination function 30 determines the drive slip from the difference between the driving speed v(t) and the speed vref(t), a driving slip san(t) that represents the slip of the driven wheels.

From these parameters, the gear signal FST, the shift request signal shr, the throttle position alpha(t), the kick-down signal kd(t), the neutral signal 11(t), the air mass ml(t), the transmission input rpm ne(t), the driving speed v(t), the transverse acceleration aq(t), the braking signal b(t), and the engine rpm nmot (t), the gear ratio control 27 determines a desired gear ratio uesoll as well as a signal for engaging clutch free/engaged AK, which are passed on to position function 31.

Position function 31, by means of signal outputs pe and pa, controls the gear ratio setting of transmission 2, with the desired gear ratio uesoll being set with the minimum possible delay, but without significant overshoot. In addition, the engaging clutch, depending on the size of the signal engaging clutch free-engaged AK, is controlled by position function 31 through signal output PK.

Figure 3:
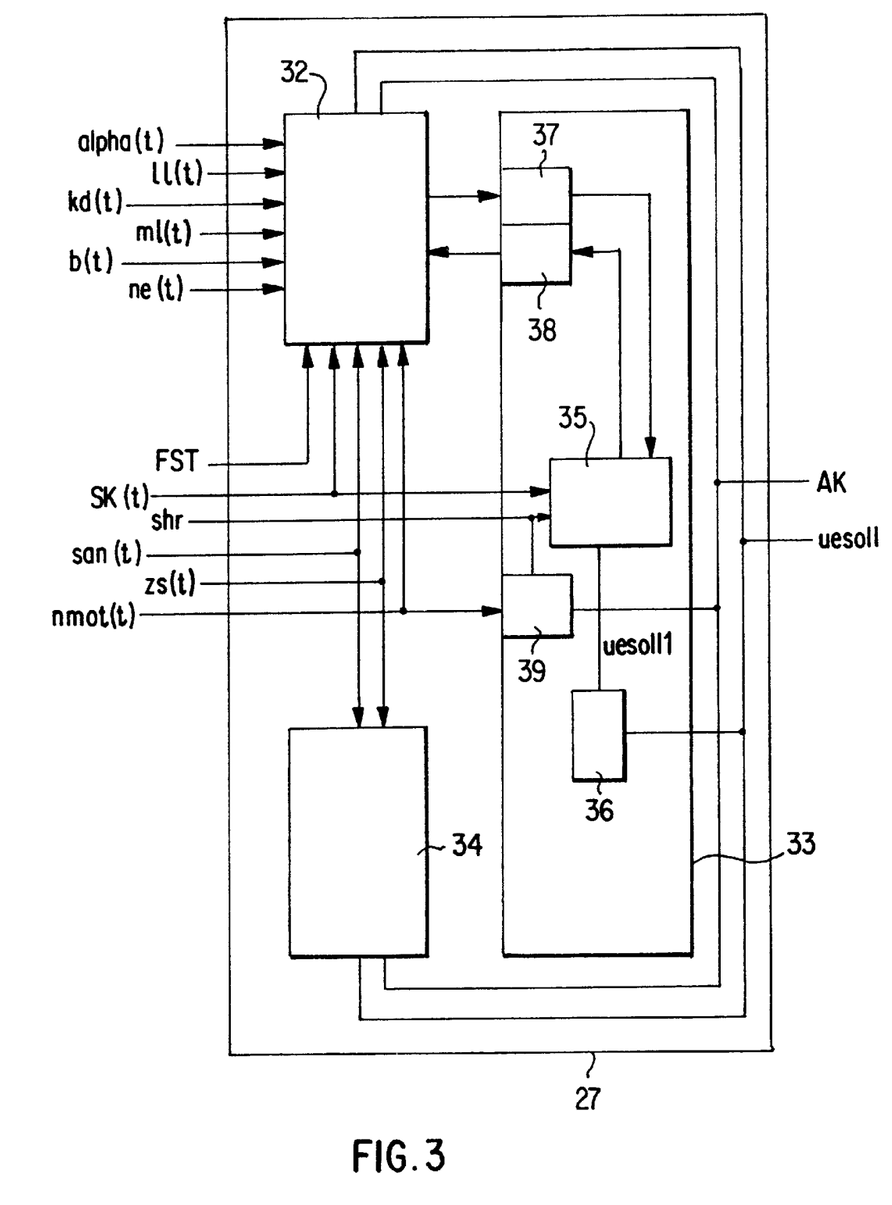
FIG. 3 is a block diagram of FIG. 2 but for the functions comprised by the gear ratio control according to FIG. 2.

FIG. 3 is an overview of the functions contained in gear ratio control 27. For the first operating mode that automatically selects the gear ratio, an automatic function 32 is provided with the input parameters accelerate/coast zs/(t), drive slip san(t), gear signal FST, driving activity SK(t), throttle position alpha(t), engine rpm nmot(t), neutral signal 11(t), kick-down signal kd(t), air mass signal ml(t), brake signal b(t), and transmission input rpm ne(t).

For the second operating mode influenced by the driver, there is a manual function 33 with input parameters shift request signal shr, driving activity SK(t), and engine rpm nmot(t). In addition, the gear ratio control 27 includes a driving safety function 34 with the input parameters accelerate/coast zs(t) and driving slip san(t). These functions generate the output signals required gear ratio uesoll and engaging clutch free/engaged AK.

Within manual function 33 a basic function 35 processes driving activity SK(t) and the shift request signal shr. The basic function 35 is followed by a wear reduction function 36 which obtains from the basic function, a signal for a first required gear ratio uesoll 1 and delivers a signal for a required gear ratio uesoll. Basic function 35 is associated with a first shift function 37 and a second shift function 38, both of which are connected with automatic function 32. Parallel with basic function 35, a safety function 39 receives the engine rpm nmot(t) and delivers the shift request signal shr as well as the signal engaging clutch free/engaged AK.

The first transfer function 37 is called up at a change from automatic function 32 to manual function 33, i.e. at a change from the first type of operation that automatically selects the gear ratio to the second type that can be influenced by the driver, and controls the transition. Conversely, the second transfer function controls the transition from manual function 33 to automatic function 32.

Figure 4:
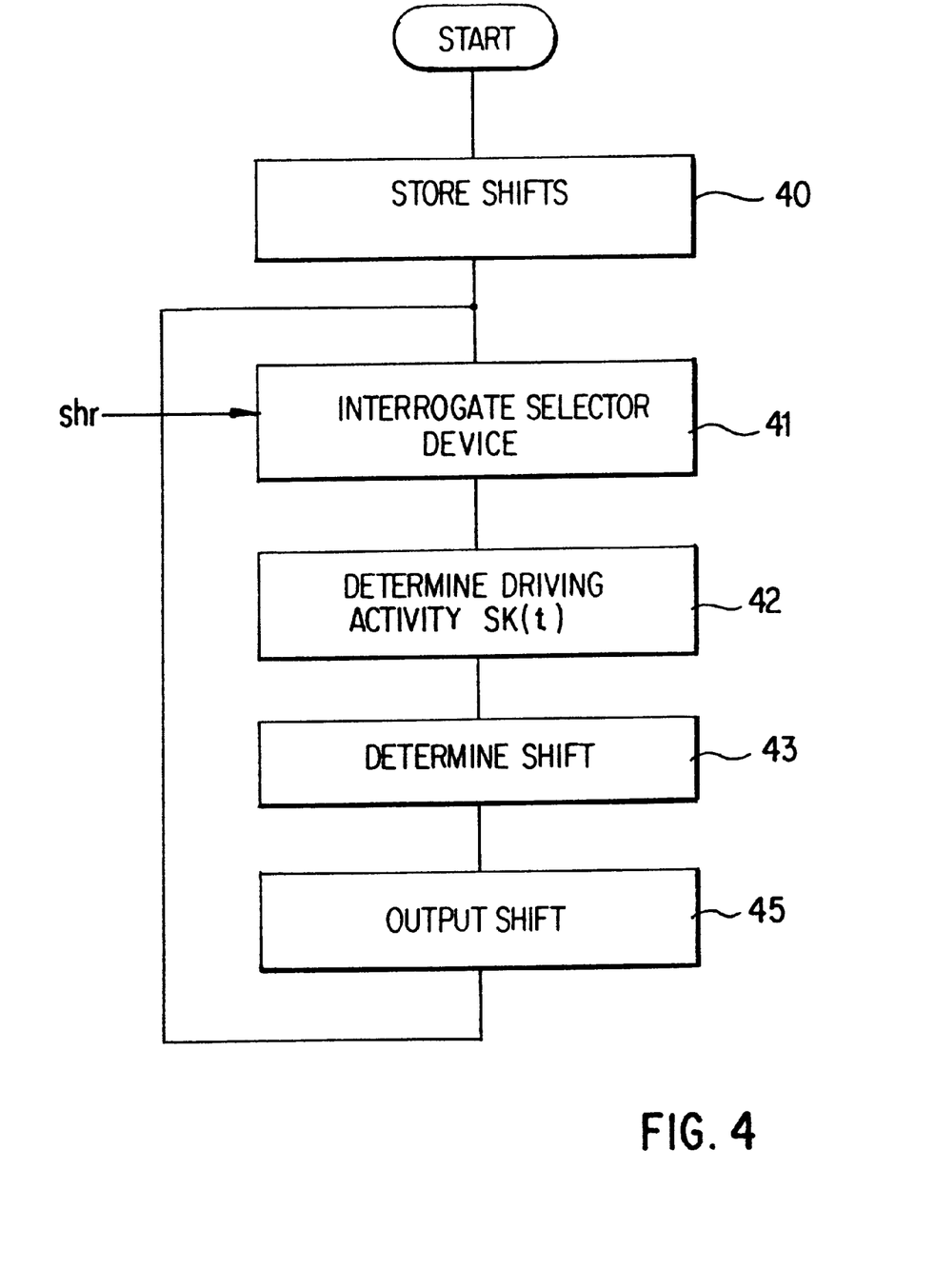
FIG. 4 is a flowchart of a first basic function.

FIG. 4 shows basic function 35 in a flowchart. In a step 40 that precedes driving, "store shifts," groups of preset shifts are stored variably in a memory, not shown, provided inside shift control 27. In driving operation, in a step 41 "interrogate selector device," a shift request signal shr (upshift or downshift) is awaited. In a subsequent step 42 "determine driving activity SK(t)" a value of driving activity SK(t) is requested by the driving activity determination function 28. This is followed by a step 43 "determine shift" which reads out the corresponding preset shift from the memory from the group of preset shifts with the shift request signal shr that belongs to the driving activity SK(t).

The required shift gear ratio determined, uesoll, is passed on in a step 45 "output gear ratio" to the wear reducing function 36. This is followed by a return to step 41 "interrogate selector device."

Figure 5:
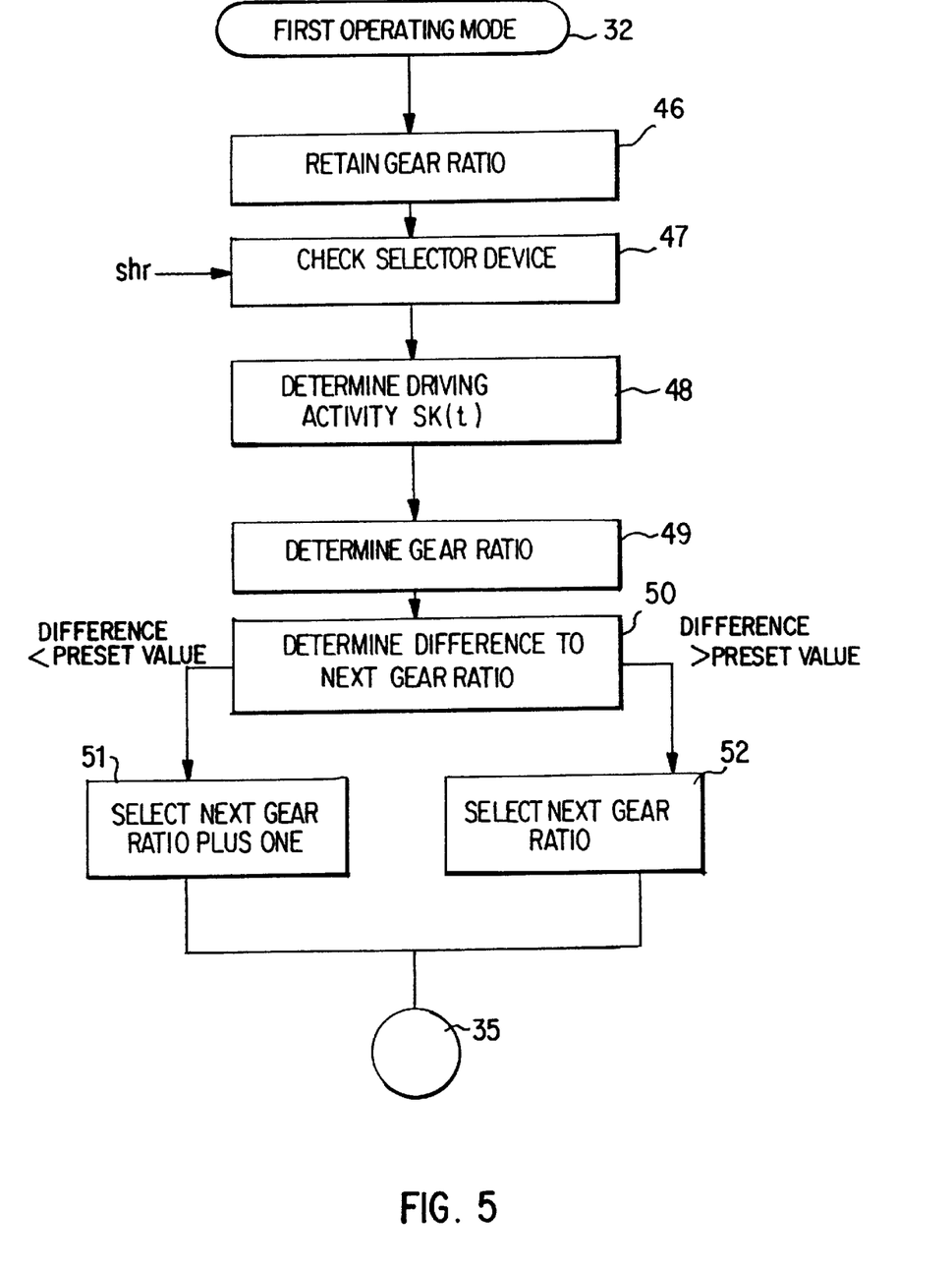
FIG. 5 is a flowchart according to FIG. 4 but for a first transition function.
Figure 5A:
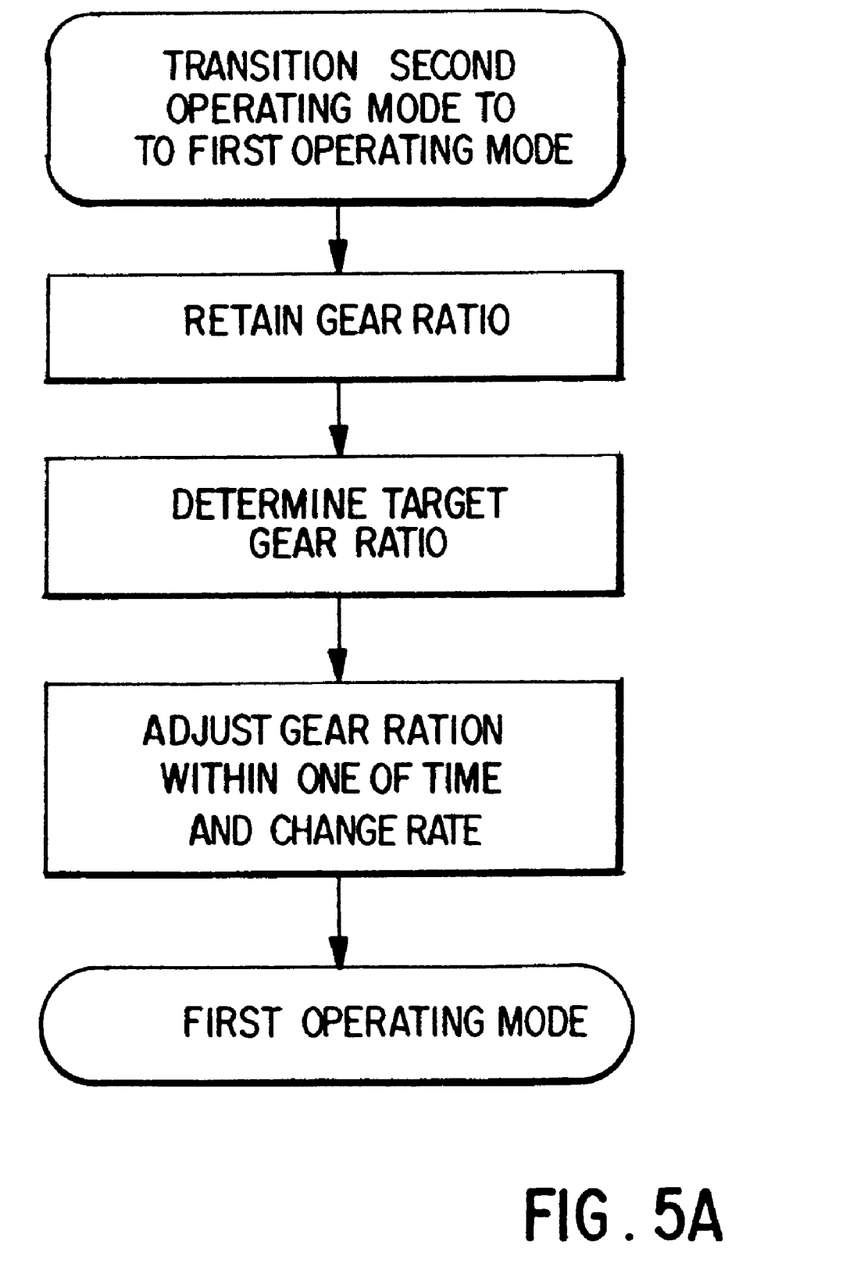
FIG. 5A is a flowchart showing the method by which, when the gear ratio set upon leaving the second operating mode is initially returned, a target gear ratio is determined and an adjustment is made to the gear ratio within one of a predetermined time and change rates.

In a flowchart, FIG. 5 shows the steps of the first transfer function 37 that are required for a transition from the first operating mode 32 which automatically selects the gear ratio to the second operating mode which is influenced by the driver. Initially, in a step 46 "return gear ratio" the gear ratio that was set at leaving automatic function 32 is maintained. In a step 47 "check selector device" a shift request signal shr from selector device 18 is awaited. This is followed by steps 48 "determine driving activity SK(t)" and 49 "determine gear ratio"; the latter determines, from driving activity SK(t) and the command of selector device 18 from the memory, the gear ratio which is next in the shifting direction and the next opposite the shifting direction. The difference between these two gear ratios is calculated as a progressive ratio.

In a step 50 it is determined whether the progressive ratio to the next gear ratio in the shifting direction, i.e., the difference from the currently set gear ratio to the next one in the shifting direction is less than a predetermined value, preferably approximately half of the progressive ratio. If the result of this determination is positive, in other words the difference is smaller, in a step 51 "select next gear ratio plus one" the gear ratio which is next plus one in the shifting direction is selected and transmitted after step 43 "determine gear ratio" to basic function 35. If the result is negative, in other words the difference is greater, in a step 52 "select next gear ratio" the next gear ratio in the shifting direction will be transmitted.

For the procedure, not shown, for the transition from the second type of operation, influenced by the driver, to the first type which automatically selects the gear ratio, the gear ratio set in the second operating mode is adjusted within a preselected time or with a preselected adjustment speed to the gear ratio to be set in the automatic operating mode.

Figure 6:
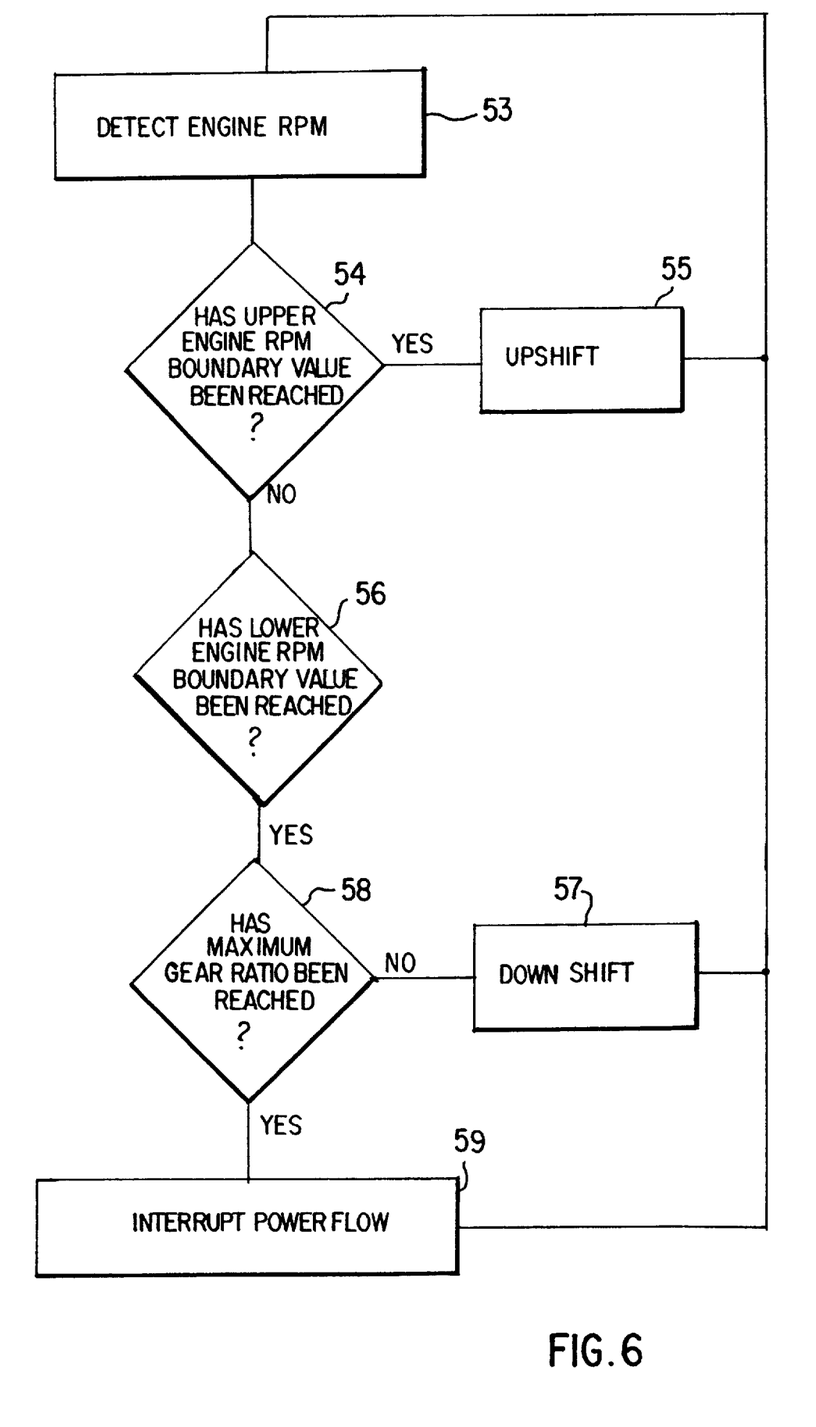
FIG. 6 is a flowchart according to FIG. 4 but for a driving safety function.

A flowchart of the driving safety function 34 is shown in FIG. 6. The engine rpm nmot(t) is constantly detected in a step 53 "detect engine rpm". When the upper engine rpm boundary value of the internal combustion engine is reached, following an interrogation 54 "Has upper engine rpm boundary value been reached?" a command 55 "upshift" is given; on reaching the lower engine rpm boundary value after a question 56 "Lower engine rpm boundary value reached?" a command 57 "downshift" is given to basic function 35. If, in addition to the lower rpm limit, in a question 58 "Maximum gear ratio reached?" the maximum preset gear ratio has been reached, driving safety function 34 in a next step 59 "interrupt power flow" delivers a signal, engaging clutch free (AK=1).

Figure 7:
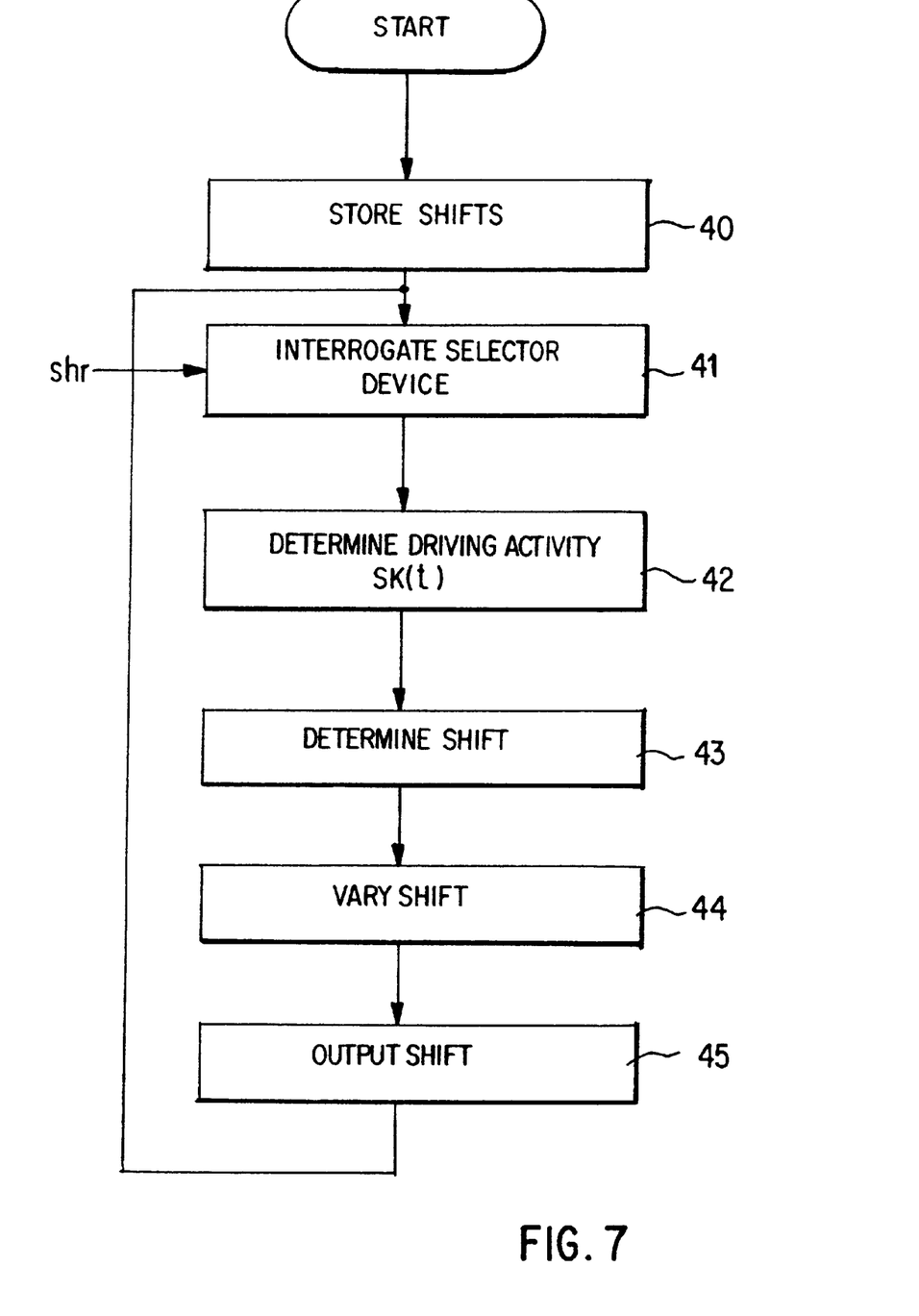
FIG. 7 is a flowchart according to FIG. 4 but for a second basic function.
Figure 8:
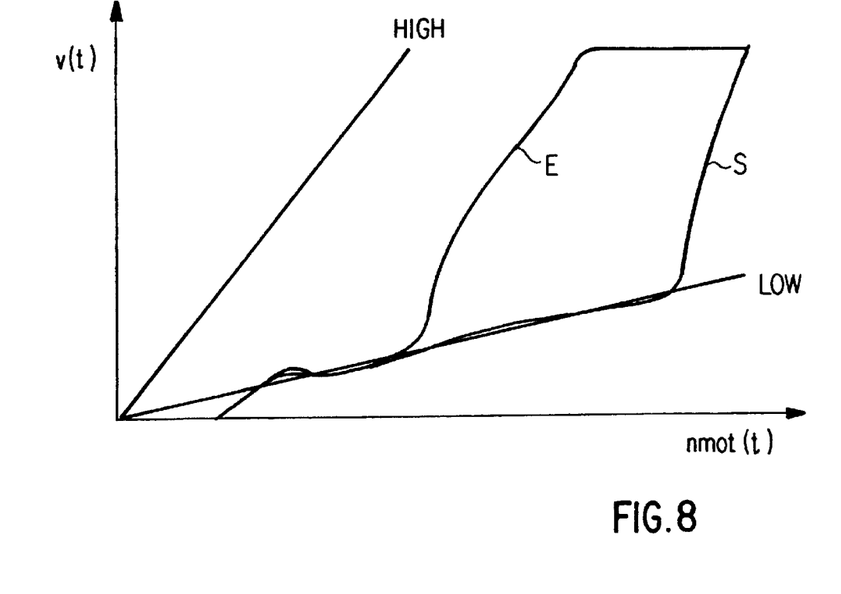
FIG. 8 is a graph of two characteristic operationg curves for full load operation.
Figure 9:
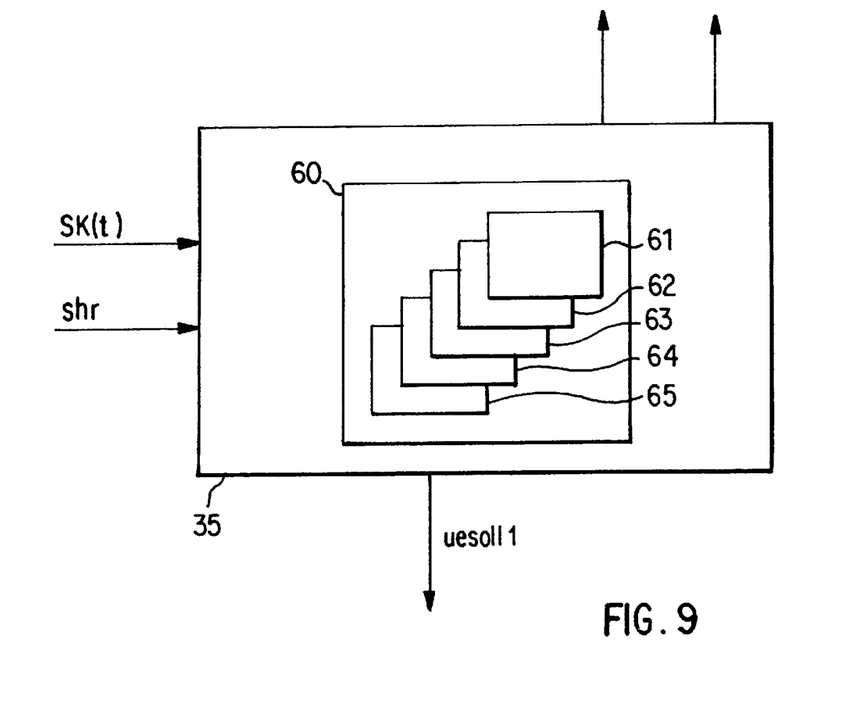
FIG. 9 is a schematic diagram of a memory of the basis function as well as preset ratios filed in the memory.

To simplify matters, provision can be made such that the separate wear reduction function 36 is integrated into basic function 35. For this purpose, as shown in a flowchart in FIG. 7, a step 44 "vary gear ratio" is added between step 43 "determine gear ratio" and step 45 "output gear ratio", which alternately changes the first required gear ratio uesolll by +3%, 0%, and −3% each time a preset gear ratio is called up and transmits uesoll as the required gear ratio.

The gear ratio control 27 acts as follows: in step 40 that precedes driving operation, "store gear ratios," groups of preset gear ratios are stored in the memory, not shown. The values for low driving activity SK(t) are assigned to groups of gear ratios corresponding to a consumption-optimized overdrive curve and the values of higher driving activity SK(t) are assigned to groups of gear ratios that correspond to a performance-optimized sporting curve.

This means that for values with low driving activity SK(t) the number and spread of the gear ratios in the corresponding group are less and for values for higher driving activity SK(t) the number and the spread of the gear ratios in the corresponding group are made larger. Thus the groups of gear ratios for low driving activities SK(t) constitute a multi-step transmission with an overdrive character and low engine rpm level while the groups of gear ratios for higher driving activities SK(t) represent a multi-stage transmission in the overspeeding design with high tractive force and engine rpm level.

In the first operating mode that automatically selects the gear ratio, the transmission is controlled through selector device 18. The gear ratio control 27 in automatic function 32 automatically selects the correct gear ratio which is then set by the position function 31 in transmission 2.

If the driver wishes to operate in the second operating mode, he moves the selector device 18 from position D to the second selector level 19. The first transfer function 37 takes over the gear ratio ue then set on transmission 2 and initially maintains it. Only when the driver, using selector device 18, delivers a shift request signal shr, is the driving activity SK(t) interrogated for the first time. From this driving activity SK(t) a corresponding group of gear ratios is selected in which the progressive ratio is then determined. If the difference between the set gear ratio, in other words the last gear ratio set in the automatic function, and the next closest gear ratio in the shifting direction is smaller than preferably approximately half the progressive ratio, it is not the next gear ratio in the shift direction, but the next but one, that is selected. At this point it is transmitted to basic function 35.

During operation in the second operating mode, in step 41 (interrogate selector device) a shift request signal shr "upshift or downshift" is awaited. In the next step 42 "determine driving activity SK(t)" a value of driving activity SK(t) is requested from driving activity determination function 28. This is followed by step 43 "determine gear ratio" which reads the corresponding preset gear ratio in the memory from the group of preset gear ratios with the shift request signal shr that belongs to driving activity SK(t). This avoids a change in driving style between two selection processes, expressed in a change in driving activity SK(t), from resulting in a change in the set gear ratio.

It is only at a change in gear ratio by the driver that a shift from the group of gear ratios corresponding to the new driving style is selected.

The selected gear ratio is passed on as a first required gear ratio uesolll in step 45 "output gear ratio" to the wear-reducing function 36 and is constant between two shift requests. As a result, in the continuously variable transmission characterized originally by continuously variable adjustability and constant change of gear ratio, a multi-step transmission is simulated whose gear ratios are stepped and, apart from the desired and wear-reducing small variation by the function "vary gear ratio," are fixed.

Figure 11:
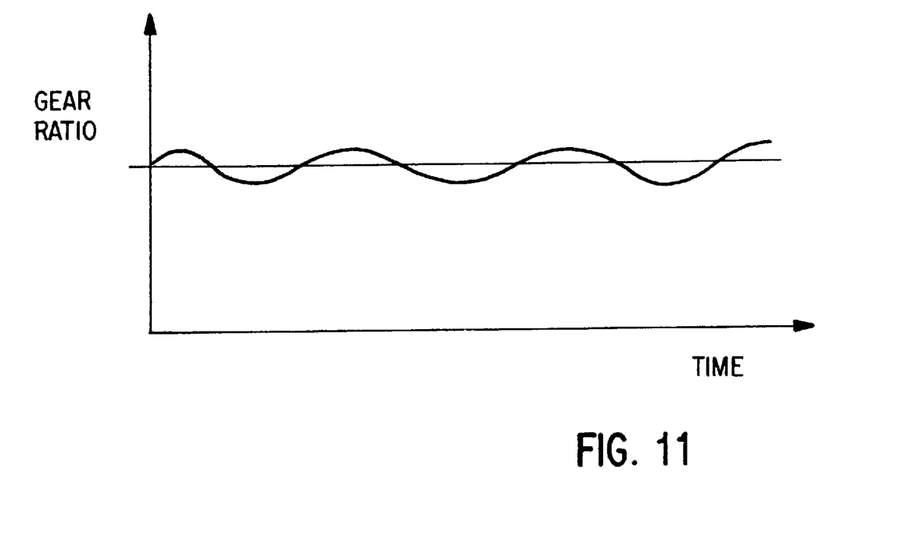
FIG. 11 is a graph showing how the set gear ratio is varied sinusoidally with low frequency and small amplitude.

In continuously variable transmissions, during operation with fixed gear ratios, wear caused by running in of the power transmitting elements can be expected. For this reason, fixed gear ratios are selected which can be varied in a separate function. This is preferably accomplished by the required gear ratio uesoll being modulated by the wear-reducing function 36 in the form of a sinusoidal oscillation with small amplitude in the range from 3% of the required gear ratio uesoll and very low frequency as shown in FIG. 11.

This is followed by a return to step 41 "interrogate selector device".

At the same time, safety function 39 monitors the engine rpm nmot(t) and delivers to basic function 35 a shift request signal shr as soon as a lower engine rpm boundary value or an upper engine rpm boundary value is reached. With the largest gear ratio and achievement of the lower engine rpm boundary value, the safety function also generates the signal engaging clutch free (AK=0) thus interrupting the power flow.

If the driver again wants to make a transition to the first operating mode, he leaves the second selected level 19 into selected position D of selecting device 18. As a result he triggers the second transfer function 38. This determines the required gear ratio to be set in automatic function 32 uesoll and matches the last gear ratio ue set in the second operating mode with a predetermined time or with a predetermined adjustment speed to the required gear ratio uesoll.

In a vehicle with a rigid gear ratio between the accelerator and the power control of the internal combustion engine, this results in a change in the tractive force which the drive must compensate. In a vehicle equipped for example with an electrical connection between the accelerator and the power control, it is possible to control the transition by an adjustment of the gear ratios when changing the operating modes in connection with a control device built into the electrical connection in such manner that no change in tractive force occurs.

Regardless of the selected operating mode, the driving safety function 34 monitors the parameters accelerate/coast zs(t) and driving slip san(t). If driving slip san(t) exceeds a preset boundary value which is calculated from the difference between the rpm of the driven wheels and the rpm of the non-driven wheels, and coasting exists simultaneously, driving safety function 34 intervenes by reducing the gear ratio and thus delivers an output signal for required gear ratio uesoll that is superior to the output signal of basic function 35. If driving slip san(t) exceeds a second larger boundary value, the power flow is interrupted as well, with the signal engaging clutch free (AK=1) being delivered. Unstable driving states that ensue when slip occurs at the driven wheels as a result of the engine drag moment, are counteracted as a result.

In conjunction with a drive-slip control in the motor vehicle, provision can also be made such that the driving safety function 34 supports the drive-slip control by changing the gear ratio.

Corresponding to U.S. Pat. No. 4,679,145 or U.S. Pat. No. 5,157,609, the subject matter of which is incorporated by reference herein, driving activity SK(t) is determined by a functional relationship that evaluates the driving style of the driver or his behavior as a function of traffic situations in the long term, from current and past values, recorded cyclically or anti-cyclically, of a single operating parameter or a single parameter composed of several operating parameters of a motor vehicle. For example, values for the throttle position alpha(t), driving speed v(t) and transverse acceleration aq(t) in the second and millisecond range are recorded and from them additional values, for example the throttle change rate dalpha(t)/dt and the acceleration of the vehicle dv(t)/dt, are calculated. The determined and calculated values are linked by characteristic diagrams with other operating parameters and combined to form an intermediate parameter by means of a functional relationship from which, by sliding averaging, which takes into account both the newly calculated values and also the past values in the long term, a driving activity SK(t) is determined.

Figure 10:
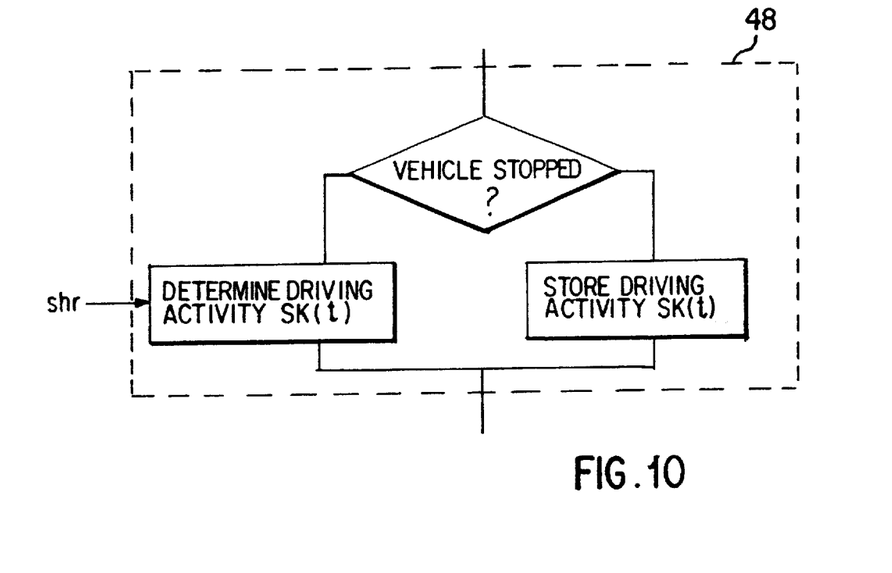
FIG. 10 is a flowchart showing the method of the present invention by which, when the vehicle is, for example, stopped, the momentary value of the driving activity SK (t) is stored, whereby evaluation of the driving style is continued following the interruption.

It has been shown especially in conjunction with continuously variable transmissions that it can be logical to interrupt the evaluation of the driver's driving style or his behavior as a function of traffic situations under specific operating states of the motor vehicle. The momentary value of driving activity SK(t), at least for the period of time for which the respective operating state occurs, is stored and the evaluation following this period of time is continued with the stored value of the driving activity SK(t), as seen in FIG. 10 in which the isolated step 48 shown in dashed lines can be used in, for example, the basic function illustrated on FIG. 4 in lieu of step 42.

A defined operating state occurs when the motor vehicle stops. This operating state can be defined for example by driving speed v(t)≈0 and neutral signal 11(t). This means that the driving activity SK(t) does not drop to the minimum value during prolonged stops of the motor vehicle with the engine running, for example stopped at a traffic light.

As selector device 18 for working the method, a selector device according to U.S. Pat. No. 4,987,792 is particularly suitable, with the shift positions mentioned therein, with the selector lever in the first notch, being replaced by the selected positions required to operate a continuously variable transmission, for example P (park), R (reverse), N (neutral), D (automatic adjustment of the gear ratio of the continuously variable transmission) and an adjustment range for direct setting of the gear ratios.

In an improvement, the two notches are not necessarily combined in one selector device but separated in space. Thus, in advantageous fashion, the first notch for operating the first operating type that selects gear ratio automatically can be provided on a drive tunnel on the vehicle, beside a driver's seat, and the second notch for operating the second operating mode influenced by the driver can be provided on a steering wheel of the vehicle. An operating element for the second notch is guided in such fashion that the driver does not have to take his hands off the wheel to operate it.

We claim:

1. Method for controlling a motor vehicle continuously variable transmission having an electrohydraulic control, a selector device, and a controllable engaging clutch comprising the step of, in a first operating mode, automatically selecting and adjusting, from selector device signals and motor vehicle operating parameters comprising at least one of throttle angle, driving speed and engine rpm, via driver selectable curves, a transmission gear ratio, and in a second operating mode permitting driver selection of a transmission gear ratio by simulating a multi-step transmission.

2. Method according to claim 1, wherein individual preset gear ratios are selected and set to simulate the multi-step transmission from a group of preset gear ratios.

3. Method according to claim 2, wherein a value of a driving activity (SK(t)) that evaluates one of driving style of the driver and driver's behavior as a function of traffic situations relative to the control of the motor vehicle is determined, and in the second operating mode, a group of preset gear ratios is selected as a function of a value of a driving activity (SK(t)).

4. Method according to claim 3, wherein the driving activity (SK(t)) is determined in a long term, sliding averaging, from one of current and past values of a single operating parameter and current and past values composed of several of the motor vehicle operating parameters.

5. Method according to claim 3, wherein, when the driving activity (SK(t)) has low values, a group of gear ratios corresponding to a consumption-optimized overdrive curve is selected and at higher values a group of gear ratios corresponding to a performance-optimized sport curve is selected.

6. Method according to claim 5, wherein the driving activity (SK(t)) is determined in a long term, sliding averaging, from one of determined current and past values of a single operating parameter and current and past values composed of several of the motor vehicle operating parameters.

7. Method according to claim 3, wherein, when the driving activity (SK(t)) has low valves, a small number of gear ratios in the corresponding group is selected, and for high values, a large number of gear ratios in the corresponding group is selected.

8. Method according to claim 7, wherein the driving activity (SK(t)) is determined in a long term, sliding averaging, from cyclically or anticyclically determined current and past values of a single operating parameter or a value composed of several of the motor vehicle operating parameters.

9. Method according to claim 8, wherein, when the driving activity (SK(t)) has low values, a group of gear ratios corresponding to a consumption-optimized overdrive curve is selected and at higher values a group of gear ratios corresponding to a performance-optimized sport curve is selected.

10. Method according to claim 3, wherein at low values of the driving activity (SK(t)), a small spread of gear ratios in the corresponding group is selected and, at high values of the driving activity (SK(t)), a large spread of gear ratios in the corresponding group is selected.

11. Method according to claim 3, wherein the step of evaluation of driving style of the driver and driver's behavior as a function of traffic situations under certain operating conditions of the motor vehicle is interrupted and a momentary value of the driving activity (SK(t)), at least for a period for which the respective operating state occurs, is stored and the evaluation following the period of time is continued, beginning with the stored value of the driving activity (SK(t)).

12. Method according to claim 11, wherein a defined operating state occurs when the motor vehicle stops.

13. Method according to claim 2, wherein a set gear ratio is varied by a desired amount.

14. Method according to claim 13, wherein the desired amount is performed as a sinusoidal oscillation with a desired frequency and amplitude.

15. Method according to claim 13, wherein with each selection of the gear ratio, the gear ratio is set alternatively in the range of +3%, 0%, and −3%.

16. Method for controlling a motor vehicle continuously variable transmission having an electrohydraulic control, a selector device, and a controllable engaging clutch, comprising the step of, in a first operating mode, automatically selecting and adjusting a transmission gear ratio, and in a second operating mode simulating a multi-step transmission with preset gear ratios directly influenceable by the driver wherein upon a transition from the first operating mode to the second operating mode, the gear ratio set upon leaving the first operating mode is retained and, at a first selection of a preset gear ratio, a next gear ratio in a shift direction is selected when a difference between the gear ratio set when leaving the first operating mode and the next gear ratio in the shift direction is greater than a preset value in the range of half the difference between the next gear ratio in the shift direction and the next gear ratio opposite the shift direction, and a next gear ratio but one in the shift direction is selected when the difference between the gear ratio set when leaving the first operating mode and the next gear ratio in the shift direction is less than a preset value in the range of half the difference between the next gear ratio in the shift direction and the next gear ratio opposite the shift direction.

17. Method for controlling a vehicle continuously variable transmission having an electrohydraulic control, a selector device, and a controllable engaging clutch, comprising the step of automatically selecting and adjusting, in a first operating mode automatically, a transmission gear ratio, and in a second operating mode simulating a multi-step transmission with preset gear ratios directly influenceable by the driver wherein upon a transition from the second operating mode to the first operating mode, the gear ratio set upon leaving the second operating mode is initially retained and, within one of a predetermined time and a predetermined change rate representative of a non-abrupt chance, an adjustment is made to the gear ratio maintained in the first operating mode.

18. Method according to claim 1, wherein independently of the driver influence on reaching an upper or lower internal combustion engine rpm limit, a different preset gear ratio is selected and used so that the internal combustion engine rpm is between the upper and lower rpm limits.

19. Method according to claim 1, wherein, independently of the driver influence, upon reaching a lower internal combustion engine rpm limit and the set maximum preset gear ratio, power flow through the controllable engaging clutch is interrupted.

20. Apparatus for controlling a motor vehicle continuously variable transmission having an electrohydraulic control, a selector device and a controllable engaging clutch, wherein the selector device has a first notch for the operation of the transmission in an operating mode which automatically selects a gear ratio and a second notch for operating the transmission in a driver-influenced operating mode in which a preset gear ratios are selected whereby, with a motion of an operating element from a central position of the second notch in a first direction, a next higher gear ratio is selected, and upon moving in a second-direction opposite the first direction, a next lower gear ratio is selected.

21. Apparatus according to claim 20, where the groups of preset gear ratios are stored in a memory.

* * * * *